United States Patent
Walldeen et al.

(10) Patent No.: US 10,327,224 B2
(45) Date of Patent: Jun. 18, 2019

(54) EFFICIENT HANDLING OF PAGING

(71) Applicant: Telefonaktiebolaget LM Ericsson (publ), Stockholm (SE)

(72) Inventors: Thomas Walldeen, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 15/525,259

(22) PCT Filed: Nov. 12, 2014

(86) PCT No.: PCT/SE2014/051345
§ 371 (c)(1),
(2) Date: May 8, 2017

(87) PCT Pub. No.: WO2016/076775
PCT Pub. Date: May 19, 2016

(65) Prior Publication Data
US 2018/0288735 A1    Oct. 4, 2018

(51) Int. Cl.
*H04W 68/02* (2009.01)
*H04W 52/02* (2009.01)
(Continued)

(52) U.S. Cl.
CPC ............. *H04W 68/02* (2013.01); *H04W 4/70* (2018.02); *H04W 52/0216* (2013.01);
(Continued)

(58) Field of Classification Search
CPC ........ Y02D 70/00; G06F 17/21; H04W 72/04
(Continued)

(56) References Cited

U.S. PATENT DOCUMENTS

2009/0310503 A1* 12/2009 Tenny ................... H04W 68/00
370/252
2013/0003629 A1     1/2013 Jeong et al.

FOREIGN PATENT DOCUMENTS

CN     102378120 A    3/2012
CN     103532684 A    1/2014

OTHER PUBLICATIONS

Communication of the European Search Report for European Application No. 14905683.0 (dated Oct. 18, 2017).
(Continued)

*Primary Examiner* — Kiet M Doan
(74) *Attorney, Agent, or Firm* — Sage Patent Group (57) ABSTRACT

A wireless device comprises a processing means operative to determine if a validity time for a paging attempt identifier number is running, wherein the paging attempt identifier number is in a received paging message. When the validity time for the paging attempt identifier number is not running, form a paging response message. When the validity time is running, the processing means compare the paging attempt identifier number of the paging message with a stored paging attempt identifier number, and form a paging response message when the received paging attempt identifier number is different from the stored paging attempt identifier number or ignore the received paging message when the received paging attempt identifier number equals the stored paging attempt identifier number. The wireless device further comprises a transmitter arranged to transmit the formed paging response message.

7 Claims, 5 Drawing Sheets

(51) Int. Cl.
*H04W 76/20* (2018.01)
*H04W 76/28* (2018.01)
*H04W 4/70* (2018.01)

(52) U.S. Cl.
CPC ........... *H04W 76/20* (2018.02); *H04W 76/28* (2018.02); *Y02D 70/00* (2018.01); *Y02D 70/1224* (2018.01); *Y02D 70/1226* (2018.01); *Y02D 70/1242* (2018.01); *Y02D 70/21* (2018.01); *Y02D 70/24* (2018.01)

(58) Field of Classification Search
USPC ......... 455/458, 414.1, 415, 417, 555, 422.1; 370/311; 345/661; 705/26.3, 14.58; 340/7.41, 7.25
See application file for complete search history.

(56) References Cited

OTHER PUBLICATIONS

International Search Report and Written Opinion of the International Searching Authority for International Application No. PCT/SE2014/051345 (dated Sep. 17, 2015).
3GPP TR 23.887 V12.0.0, "3rd Generation Partnership Project; Technical Specification Group Services and System Aspects; Study on Machine-Type Communications (MTC) and other mobile data applications communications enhancements (Release 12)," 151 pages (Dec. 2013).
3GPP TS 23.060 V12.5.0, "3rd Generation Partnership Project; Technical Specification Group Services and System Aspects; General Packet Radio Service (GPRS); Service description; Stage 2 (Release 12)," 347 pages (Jun. 2014).
3GPP TS 23.401 V12.5.0, "3rd Generation Partnership Project; Technical Specification Group Services and System Aspects; General Packet Radio Service (GPRS) enhancements for Evolved Universal Terrestrial Radio Access Network (E-UTRAN) access; (Release 12)," 305 pages (Jun. 2014).
3GPP TS 24.008 V12.6.0, "3rd Generation Partnership Project; Technical Specification Group Core Network and Terminals; Mobile radio interface Layer 3 specification; Core network protocols; Stage 3 (Release 12)," 698 pages (Jun. 2014).
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)," 365 pages (Jun. 2014).
3GPP TS 36.413 V12.0.0, "3rd Generation Partnership Project; Technical Specification Group Radio Access Network; Evolved Universal Terrestrial Radio Access Network (E-UTRAN); S1 Application Protocol (S1AP) (Release 12)," 285 pages (Jun. 2014).
3GPP TS 36.300 V12.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 215 pages (Jun. 2014).
3GPP TS 36.304 V12.1.0, "3rd Generation Partnership Project; Technical Specification Group Radio Access Network; Evolved Universal Terrestrial Radio Access (E-UTRA); User Equipment (UE) procedures in idle mode (Release 12)," 35 pages (Jun. 2014).
3GPP, "Motivation for SA2 Rel-13 WID Proposal Extended DRX for Idle mode," Qualcomm Incorporated, 9 pages (2009).

* cited by examiner

EFFICIENT HANDLING OF PAGING

CROSS REFERENCE TO RELATED APPLICATION

This application is a 35 U.S.C. § 371 national stage application of PCT International Application No. PCT/SE2014/051345, filed on Nov. 12, 2014, the disclosure and content of which is incorporated by reference herein in its entirety.

TECHNICAL FIELD

The present disclosure relates to a wireless device for a network and a method performed in said wireless device.

The present disclosure further relates to a core network node and a method performed in said core network node.

BACKGROUND

The introduction of devices which are used for Machine-Type Communications, MTC, includes a use case with a less stringent requirement for downlink, i.e. mobile terminated reachability and relaxed latency requirements for downlink data delivery. Furthermore it is assumed that battery lifetime is one of the key aspects given that many of the devices might have no access to external power supply. It is known to monitor these devices downlink when in idle mode less frequently than supported by the current specifications. In one example, the Discontinuous Reception, DRX, cycle in connected and Idle mode is then extended compared to the legacy operating points, see 3GPP TR 23.887 v12.0.0 chapter 7 and S2-142585.

SUMMARY

One object of the present invention is to improve monitoring of wireless devices used for Machine-Type Communications.

One embodiment of the present disclosure relates to a wireless device for handling paging in a network, said wireless device comprising processing means and a transmitter. The processing means are operative to determine if a validity time for a paging attempt identifier number is running. The paging attempt identifier number is comprised in a received paging message. In one example, the validity time for the paging identifier number is running on a timer. The processing means are further arranged to form a paging response message when the validity time for the paging attempt identifier number is not running.

When the validity time for the paging attempt identifier number is running, the processing means are operative to compare the paging attempt identifier number of the paging message with a stored paging attempt identifier number. When the received paging attempt identifier number is different from the stored paging attempt identifier number, the processing means are operative to form a paging response message. When the received paging attempt identifier number equals the stored paging attempt identifier number, the processing means are operative to ignore the received paging message. The transmitter is arranged to transmit the formed paging response message. If no paging message was formed, no transmission of a paging response message is carried out.

The solution enables the wireless device to identify an already received paging message.

The solution enables the wireless device to discard repetition of the same paging messages without increasing the probability for missing different paging messages.

The solution enables improved wireless device battery lifetime given that the wireless devices will not engage in invalid paging response procedures.

The solution enables the network to increase the DRX cycle for wireless devices in Idle mode without negatively impacting system capacity through resource allocation of outdated paging response procedures.

In one option, the processing means comprises a processor and a memory, wherein said memory is containing instructions executable by said processor.

In one option the wireless device comprises a receiver arranged to receive the paging message comprising the paging attempt identifier number.

In one option, the processing means are further operative to determine whether the transmitted paging response was successful and when determined successful store the paging attempt identifier number in the memory and start counting the validity time for the paging attempt identifier number.

In one option, the transmitter is arranged to re-transmit the formed paging response when the transmitted paging response was not determined successful until the paging response is determined successful or until a predetermined number of attempts have been made, whichever occur first.

In one option, the wireless device is further operative to inactivate or delete the currently stored paging attempt identifier number upon reaching the validity time for that paging attempt identifier number.

In one option, the validity time for the paging attempt identifier number is determined to be equal to the length of a Discontinuous reception, DRX, cycle associated to the wireless device or a multiple of the length of the Discontinuous reception, DRX, cycle associated to the wireless device.

In one option, information related to the validity time for the paging attempt identifier number is
- comprised in dedicated signaling for example in the received paging message and/or
- comprised in system information provided in dedicated signaling or on broadcast channel, and/or
- obtained over Non-access stratum, NAS, signaling, and/or
- configured for example by Open Mobile Alliance Device Management, OMA DM.

One embodiment of the present disclosure relates to a computer-readable storage medium (662), having stored thereon a computer program operative to
- determine if a validity time for a paging attempt identifier number is running, wherein the paging attempt identifier number is comprised in a received paging message, and
- when the validity time for the paging attempt identifier number is not running, form a paging response message,
- when the validity time for the paging attempt identifier number is running, compare the paging attempt identifier number of the received paging message with a stored paging attempt identifier number, and form a paging response message when the received paging attempt identifier number is different from the stored paging attempt identifier number or ignore the received paging message when the received paging attempt identifier number equals the stored paging attempt identifier number.

One embodiment of the present disclosure relates to a method performed in a wireless device. The method comprises a step of: determining if a validity time for a paging attempt identifier number is running, wherein the paging attempt identifier number is comprised in a received paging message. When the validity time for the paging attempt identifier number is not running, the method comprises forming a paging response message. When the validity time for the paging attempt identifier number is running, the method comprises comparing the paging attempt identifier number of the Paging message with a stored paging attempt identifier number. The paging response message is formed when the received paging attempt identifier number is different from the stored paging attempt identifier number. When the attempt identifier number is equal to the stored paging attempt identifier number, the received paging message is ignored. No paging response is then formed. The method further comprises a step of transmitting the formed paging response, if formed.

In one option, the method comprises the steps of determining whether the transmitted paging response was successful. When determined successful, the method comprises storing the paging attempt identifier number in the memory and starting running of the validity time for the stored paging attempt identifier number.

In one option, the method further comprises a step of inactivating or deleting the currently stored paging attempt identifier number upon reaching the validity time for the paging attempt identifier number.

The present disclosure further relates to a core network node for handling paging in a network, said core network node comprising a processing means operative to form a paging message comprising a paging attempt identifier number.

In one option, the processing means comprise a processor and a memory wherein said memory is containing instructions executable by said processor.

In one option, the core network node further comprises a transmitter arranged to transmit the formed paging message comprising the paging attempt identifier number.

The present disclosure further relates to a computer-readable storage medium, having stored thereon a computer program operative to form a paging message comprising a paging attempt identifier number.

The present disclosure further relates to a method for paging performed in a core network node. The method comprises the steps of forming a paging message comprising a paging attempt identifier number and a step of transmitting the formed paging message comprising the paging attempt identifier number.

In one option, the method for paging performed in a core network node further comprises a step of determining whether the paging attempt identifier number is to be included in the paging message, wherein the step of forming the paging message is performed based on the determination whether the paging attempt identifier number is to be included in the paging message.

One embodiment of the present disclosure relates to a wireless device for handling of paging. The wireless device comprises a validity time determining module arranged to determine if a validity time for a paging attempt identifier number is running, wherein the paging attempt identifier number is comprised in a received paging message. The wireless device comprises further a paging response forming module arranged to, when the validity time for the paging attempt identifier number is not running, form a paging response message. The wireless device comprises further a comparing module arranged to compare the paging attempt identifier number of the received paging message with a stored paging attempt identifier number when the validity time for the paging attempt identifier number is running. The paging response forming module is then arranged to form the paging response message when the received paging attempt identifier number is different from the stored paging attempt identifier number or ignoring the received paging message when the received paging attempt identifier number equals the stored paging attempt identifier number. Thus, when the received paging attempt identifier number equals the stored paging attempt identifier number, a paging response message is not formed. The wireless device comprises further a transmitter arranged to transmit the formed paging response.

In one option, the wireless device comprises a paging response handling module arranged to determine whether the transmitted paging response was successful and when determined successful, storing the paging attempt identifier number in the memory and starting running the validity time for the stored paging attempt identifier number.

DETAILED DESCRIPTION

Figure 1A:
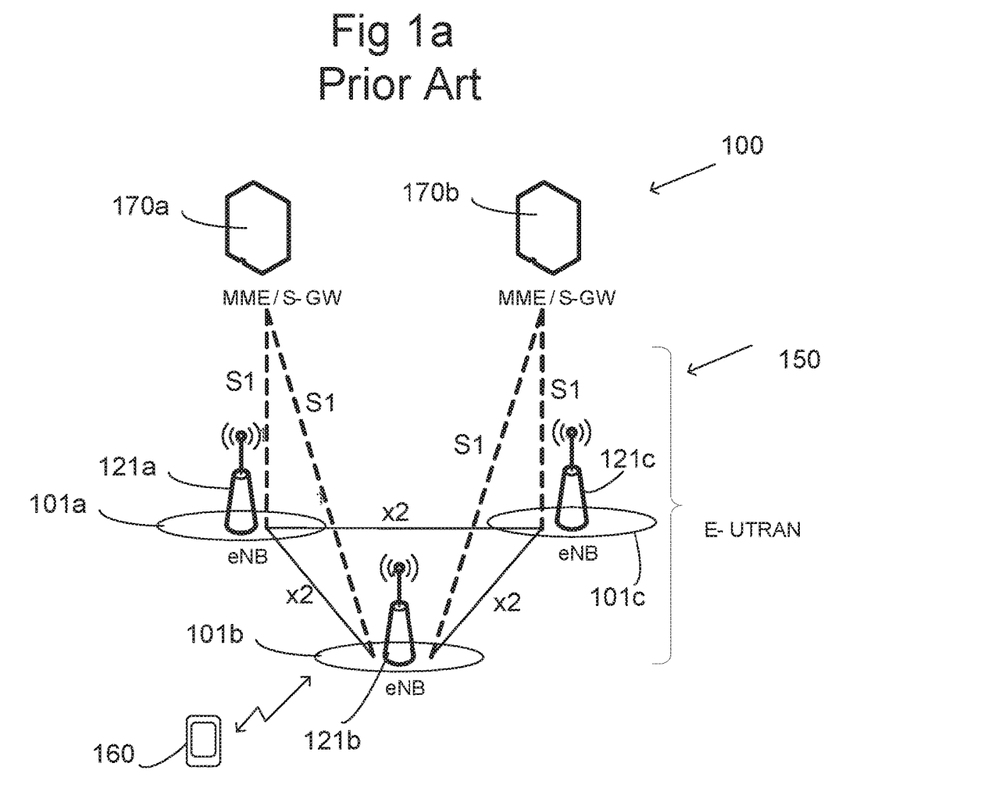
FIG. 1a illustrates schematically an example of signalling in an Evolved UMTS Terrestrial Radio Access Network, E-UTRAN.

In FIG. 1a, a cellular network is illustrated based on evolved UMTS Terrestrial Radio Access Network, E-UTRAN 150 and Mobile Management Entities MMEs and Serving Gateways, S-GWs which are part of an Evolved Packet Core network, EPC. However, this is only an illustrating example and the disclosure herein is applicable also to other radio access technologies such as GSM EDGE Radio Access Network, GERAN or UMTS Terrestrial Radio Access Network, UTRAN.

The E-UTRAN 150 comprises a plurality of evolved Node Bs, eNodeBs, 121a, 121b, 121c. Each eNodeB 121a, 121b, 121c covers one or a plurality of cells 101a, 101b, 101c. The eNodeBs 121a, 121b, 121c are interconnected with each other via a first interface X2. The eNodeBs 110a, 110b, 110c are connected via a second interface S1 to an Evolved Packet Core, EPC. The EPC comprises one or a plurality of Mobility Management Entities, MMEs, and at least one Serving Gateway, S-GW, 170a, 170b. A wireless device 160 has access to the E-UTRAN, 150 via a source cell 101b.

In the cellular networks like E-UTRAN, paging occasions, PO, where wireless devices in Idle mode may receive a paging message are based on a System Frame Number, SFN, on the radio interface Uu and IMSI number of the subscriber associated with the wireless device. The paging occasions where wireless devices in Idle mode may receive a paging message is in one example also based on other parameters. Each paging occasion is mapped on a specific SFN value and it occurs in a cyclic manner. In the context of this disclosure, it is assumed that the cells are not synchronized. This means that the SFN on the Uu interface at any given point in time might take different values in different cells. As a consequence, a particular SFN value that carries a paging occasion for a specific wireless device will occur in different cells at different points in time.

The following problems are seen with the existing solutions described above, occurring at least when a DRX cycle for the Idle mode is extended to values beyond today's specifications. The DRX cycle for the Idle mode is sometimes referred to as a paging cycle.

Figure 1B:
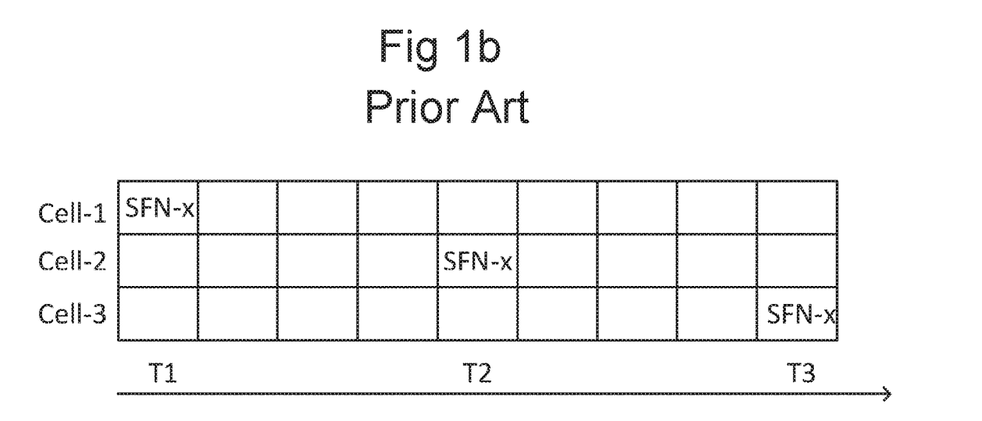
FIG. 1b illustrates schematically paging in a wireless device.

In FIG. 1b, the paging occasion is mapped on System Frame Number with the value x, SFN-x, carrying a paging message to a wireless device. The paging occasion occurs on the Uu interface in different cells, illustrated as cell-1, cell-2, and cell-3, at different points in time. The spread in time of the occurrence of a particular SFN-x and thus paging occasion for a particular wireless device will grow the more Discontinuous Reception, DRX, Cycle is extended. In one example the Discontinuous Reception, DRX, Cycle is extended to be in the range of tens of minutes. The steps below describe a possible scenario where a wireless device that is subject for paging in its paging occasion mapped on SFN-x moves across the non-synchronized cell where the SFN-x and thus its paging occasion occurs at different points in time, e.g. some minutes apart.

At time T0 (not shown), MME sends a S1AP paging request message to a set of eNodeBs that have configured cells which are subject for paging, i.e. where the MME assumes that the paged wireless device might be served. The paging request is addressed to the wireless device having its PO mapped on SFN-x. The S1AP paging request is received in the set of cells, in the figure denote cell-1, cell-2 and cell-3. The S1AP paging request is queued until the SFN-x occurs.

At time T1, SFN-x occurs on the Uu interface in the first cell, cell-1. Hence the first cell, Cell-1, sends the paging message on the Uu interface accordingly. The wireless device receives its paging message and replies to it successfully. The MME receives paging response and enables downlink data transfer.

During a time period T1<t<T2 between SFN-x occurrence on the Uu interface in the first cell, cell-1 and on the Uu interface in the second cell, cell-2, the wireless device conducts some data exchange with the network followed by a Radio Resource Control, RRC, connection release before time T2. The wireless device arrives in Idle mode in the second cell, cell-2 at t<T2.

At time T2, SFN-x occurs on the Uu interface in the second cell, cell-2. Hence now the second cell, cell-2, sends the very same paging message as has been sent at time T1 on the Uu interface in the first cell, cell-1. The wireless device receives its paging message and replies to it successfully. The MME receives a paging response but has no outstanding paging for that wireless device as that was already concluded via the first cell, cell-1 at time T1. After some time, eNodeB of the second cell will release the RRC connection.

During a time period T2<t<T3, the wireless device arrives in Idle mode in the third cell, cell-3.

At time T3, SFN-x occurs on the Uu interface in the third cell, cell-3. Hence now the third cell, cell-3 sends the very same paging message as has been sent at time T1 and T2 on the Uu interface in the third cell. The wireless device receives its paging message and replies to it successfully. The MME receives a paging response but has no outstanding paging for that wireless device as that was already concluded via the first cell, cell-1, at time T1. After some time, eNodeB of the third cell will release the RRC connection.

Thus, the wireless device will be paged with the same paging message multiple times. Given that the device has no means to identify that it is repeatedly paged with the same paging message it replies to all these paging messages. This results in:

Increased consumption of the radio resources as the wireless device will consume resource to convey its paging response message to the network and/or Increased power consumption in the device and thus decreased battery lifetime due to useless paging response procedures conducted by the wireless device and/or Increase of the interference level in the network and thus decreased system capacity Thus, there is a need for a solution.

Figure 2:
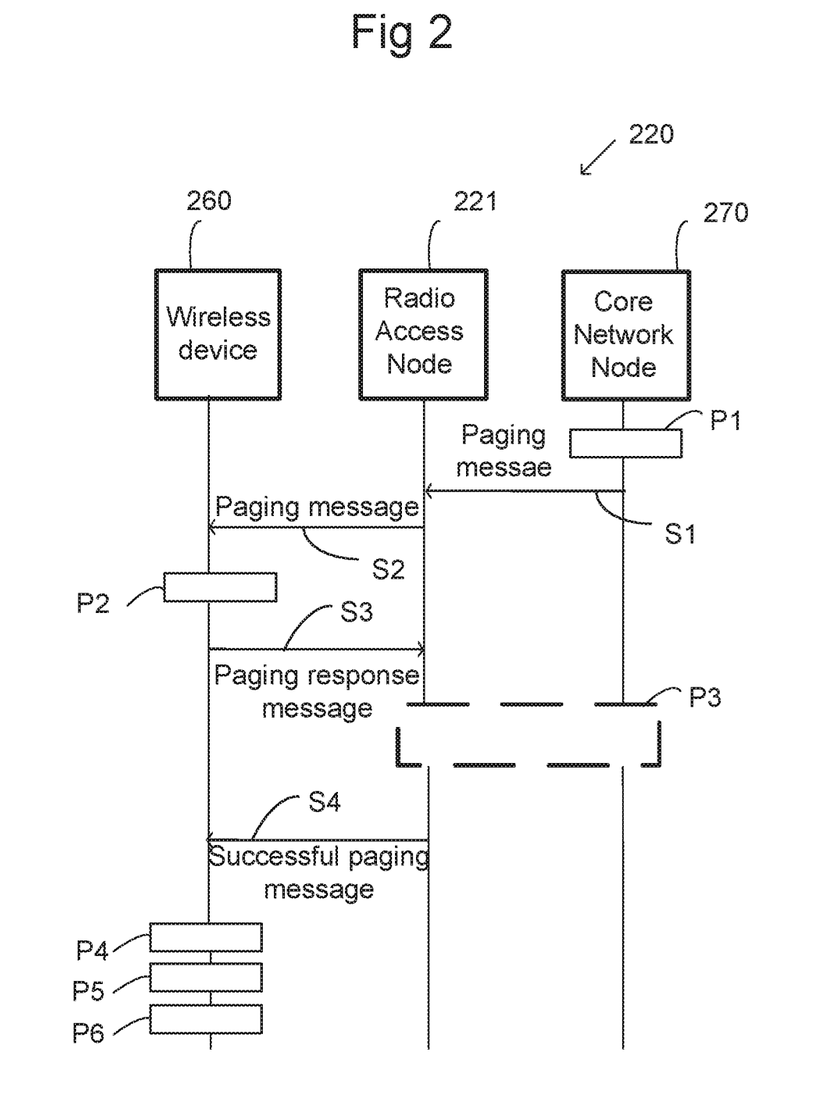
FIG. 2 is a signal scheme illustrating an example of signalling in a cellular network according to a first example.

FIG. 2 is a signal chart illustrating the signalling in a network according to a new scheme. Signalling is performed so as to enable the network to increase the DRX cycle for wireless devices in Idle mode without impacting the system capacity due to resource allocation for outdated paging response procedures.

The signalling involves a core network node 270, a radio access node 221 and a wireless device 260. The wireless device is any type of wireless device such as e.g. a device used for Machine-Type Communications, MTC. Characteristically, the Machine-Type Communication devices are used in use cases with a less stringent requirement for downlink, i.e. mobile terminated reachability and relaxed latency requirements of downlink data delivery. Further, it is assumed that battery lifetime is one of the key aspects given that many of the Machine-Type Communications devices have no access to external power supply.

The core network node 270 comprises a process P1 for forming a paging message comprising a paging attempt identifier number. The core network node 270 transmits S1 the formed paging message comprising the paging attempt identifier number to the radio access node 221. The transmission is in one example performed by wire. The transmission is in one example performed wirelessly. In one example the transmission is performed by a combination of wire and wirelessly. In one example the core network node comprises a Mobility Management Entity, MME. In one example, the core network node comprises a Serving GPRS Support Node, SGSN.

The radio access node 221 receives the paging message. The radio access node transmits S2 the paging message to the wireless device 260. In one example the paging message is modified at the radio access node before transmission to the wireless device. However, it still comprises the paging attempt identifier number.

The wireless device 260 receives the paging message. Then, a paging message handling procedure P2 is performed. The paging message handling procedure P2 involves that the wireless device 260 determines if a validity time for the paging attempt identifier number comprised in the received paging message is running. Note that the validity time is only running if there was a paging message comprising a paging attempt identifier number received earlier. When the validity time for the paging attempt identifier number is not running, the wireless device forms a paging response message.

The paging message handling procedure P2 further involves that when the validity time for a paging attempt identifier number is running, the wireless device 260 compares the paging attempt identifier number of the received paging message with a stored paging attempt identifier number. The wireless device further forms the paging response message when the received paging attempt identifier number is different from the stored paging attempt identifier number. The wireless device ignores the received paging message when the received paging attempt identifier number equals the stored paging attempt identifier number.

Thereafter, the wireless device transmits S3 the formed paging response message. If the wireless device has ignored the received paging message, no paging response message is transmitted.

A procedure P3 is then performed to determine whether the transmitted paging response was successful. This will not be explained more in detail. If determined successful the radio access node 221 signals S4 to the wireless device that the paging was determined successful. In one example, the signalling indicating successful paging response is not made explicitly. Instead it is made implicitly. A successful paging response is in one example determined by a subsequent successful communication with the network. For example, the signalling indicating successful paging response comprise that the wireless device establishes a RRC connection and sends a message to the network. Thereby, a successful paging response is obtained. When determined successful, the paging attempt identifier number is stored P4 in a memory of the wireless device. Further, running of the validity time for the paging attempt identifier number is started P5.

In one example, the currently stored paging attempt identifier number is inactivated or deleted P6 upon reaching the validity time for the paging attempt identifier number.

Figure 3:
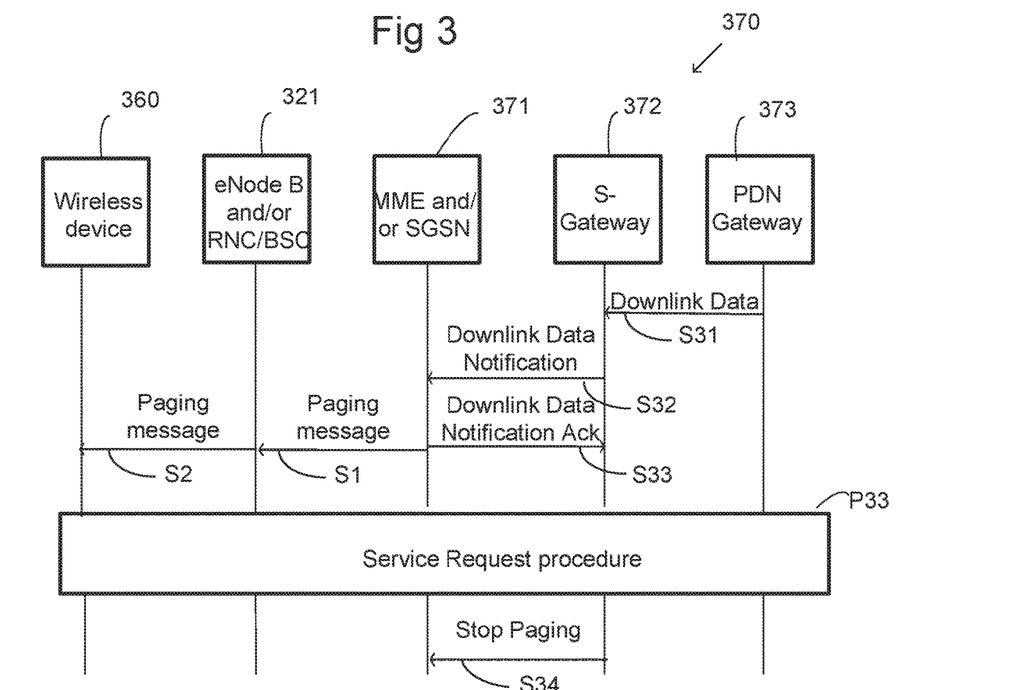
FIG. 3 is a signal scheme illustrating an example of signalling in a cellular network according to a second example.

FIG. 3 is a signal chart illustrating the signalling in an E-UTRAN network. As discussed in relation to FIG. 2, signalling is performed so as to enable the network to increase the DRX cycle for wireless devices in Idle mode without impacting the system capacity due to resource allocation for outdated paging response procedures.

As in FIG. 2, the signalling involves a core network node 370, a radio access node 321 and a wireless device 360. The core network node comprises a PND gateway 373, a Serving Gateway 372 and a Gateway for MME/SGSN 371. The radio access node 321 comprises an evolved Node B, eNodeB.

At reception of a Downlink Data Notification, DDN, from the Serving Gateway 372, for a wireless device in EPS Mobility Management, EMM, -IDLE state, the MME is triggered to perform paging. The MME forms a paging message such as a S1AP PAGING message. At least if extended DRX is used, paging attempt identifier number is comprised in the paging message. The message sent from the MME to the eNodeB over the S1 interface is in one example specified in 3GPP TS 36.413. In one example, the 3GPP TS 36.331 defines the paging message that is sent over the Uu interface to the wireless device. That paging message is enhanced by the paging attempt identifier number.

The decision to comprise the paging attempt identifier number in the paging message is in one example based on the length of the paging DRX cycle, and/or device capabilities provided by the wireless device over Access Stratum or Non-Access Stratum and/or eNodeB capabilities provided by the eNodeB over S1AP interface or by means of Operation Administration Maintenance. In one example, a new Information Element, IE, comprises the paging attempt identifier number. The same paging attempt identifier number value is used when the paging procedure needs to be repeated. The paging attempt identifier number is set per DDN trigger received from the Serving Gateway.

The eNodeB 321 adds the paging attempt identifier number value that it has received in the S1AP Paging message from the MME to the paging message sent to the wireless device(s) over the Uu interface. The eNodeB 321 sends the paging message to the wireless device in the paging occasion valid for that particular wireless device.

The wireless device receives the paging message addressed to it.

A decision flow is performed in the wireless device which enables support of the paging attempt identifier number in the received paging message.

The wireless device which has received a paging message that comprises a paging attempt identifier number is arranged to
    If the validity timer is not running
        Perform paging response as per legacy procedure
        If the paging response was
            Successful then
                store the paging attempt identifier value for a specific time period referred to as a validity time for the paging attempt identifier number. This means that the wireless device starts a timer with the value set by the validity time. This time period can be e.g. the length of its DRX cycle or multiple of its DRX cycle. The validity time value can be provided to the wireless device by the network in the dedicated signaling, e.g. in the paging message or in the system information or over NAS signaling or configured for example by OMA DM
        If not successful, after number of re-attempts if such are supported
        Then the wireless device moves into Idle mode
    If the validity time timer is running
        the wireless device compares the received paging attempt identifier number value with the currently stored paging attempt identifier value. In case that both paging attempt identifier values are:
        the same
        the wireless device discards the new paging message. Further, the wireless device does not trigger access procedure for the transfer of paging response message. This means that the wireless device ignore this paging message and go to Idle.
        or
            not the same:
            The wireless device replies to the paging message as per legacy procedure.
            If the paging response was
            Successful then
                Store the new paging attempt identifier number value, i.e. replace the previously stored with the new received value.
                Restart the validity time timer with the validity time value.
            If not successful, after number of re-attempts if such are supported
    When the validity time expires the wireless device deletes the currently stored paging attempt identifier number value. The timer is in one example then kept running. The timer is in one example allowed to expire when the device is powered off.

In detail, the Serving Gateway 372 receives a downlink data packet/control signalling S31 for a wireless device. In one example the received downlink data packet/control signalling S31 for the wireless device is known as not user plane connected. In practice, this characteristically means that Serving Gateway context data indicates no downlink user plane Tunnel Endpoint Identifier, TEID. The Serving Gateway 372 buffers the downlink data packet and identifies which MME is serving that wireless device. In the illustrated example, the Serving gateway receives the downlink data from a Public Data Network, PDN.

If the MME serving the wireless device has requested the Serving Gateway to throttle downlink low priority traffic and if the downlink data packet is received on a low priority bearer to be throttled, the serving gateway drops in one example the downlink data. The steps below are then not executed.

If the MME serving the wireless device has requested the serving gateway to delay sending the Downlink Data Notification, the Serving Gateway 372 buffers the downlink data and waits a predetermine time period before continuing. If downlink Tunnel Endpoint Identifier, DL-TEID, and eNode B address for the wireless device is received before the expiry of the predetermined time period, the waiting is stopped and the Network triggered Service Request procedure is finished. The steps below are then not executed. This means that downlink data are sent to the wireless device.

If the Serving Gateway receives additional downlink data packets/control signalling for the wireless device before the predetermined time period has expired, the Serving Gateway does in one example not restart the delay the predetermined time period.

The Serving Gateway 372 sends a Downlink Data Notification message S32 to the MME and/or SGSN nodes for which it has control plane connectivity for the given wireless device 360. An Address Resolution Protocol, ARP and Evolved Packet System, EPS, bearer are set in Downlink Data Notification. The MME and/or SGSN respond to the S-GW with a Downlink Data Notification Ack message S33. A priority indicator, i.e. ARP is derived from the bearer triggering the Downlink Data Notification. The ARP and EPS Bearer ID are in one example sent to the SGSN as well as MME, but the usage of these parameters at SGSN is not specified in this specification.

If the Serving Gateway, while waiting for the user plane to be established, is triggered to send a second Downlink Data Notification message S32 for a bearer with higher priority, i.e. ARP, than the first Downlink Data Notification message S32 was sent for, the SGW sends in one example a new Downlink Data Notification message indicating the higher priority to the MME. If the Serving Gateway receives additional downlink data packets for a bearer having the same or lower priority than the first Downlink Data Notification or if the Serving GW has sent the second Downlink Data Notification message indicating the higher priority and receives additional downlink data packets for the wireless device, the Serving gateway buffers in one example these downlink data packets and does not send a new Downlink Data Notification.

If a Tracking Area Update procedure with the MME change or a Routing Area Update procedure is in progress when the old MME receives a Downlink Data Notification message, the old MME may reject a Downlink Data Notification message with an indication that the Downlink Data Notification message has been temporarily rejected.

Similarly, if the Routing Area Update procedure with SGSN change or the Tracking Area Update procedure is in progress when the old SGSN receives a Downlink Data Notification message, the old SGSN may reject a Downlink Data Notification message with an indication that the Downlink Data Notification message has been temporarily rejected.

Upon reception of a rejection for a Downlink Data Notification message with an indication that the Downlink Data Notification message has been temporarily rejected and if the Downlink Data Notification is triggered by the arrival of downlink data packets at the Serving Gateway, the Serving GW starts in one example a locally configured guard timer and buffers all downlink user packets received to the wireless device and waits for a Modify Bearer Request message to come. The Serving Gateway continues upon reception of a Modify Bearer Request message, otherwise the Serving GW releases buffered downlink user packets at expiry of the guard timer or receiving the Delete Session Request message from MME/SGSN.

Upon reception of a rejection for a Downlink Data Notification message with an indication that the Downlink Data Notification message has been temporarily rejected and if the Downlink Data Notification is triggered by the arrival of signalling messages at the Serving Gateway 372, the Serving Gateway may reject the PDN Gateway 373 initiated EPS bearer(s) request with the same indication that the request has been temporarily rejected. Upon reception of a rejection for an EPS bearer(s) PDN Gateway 373 initiated procedure with an indication that the request has been temporarily rejected, the PDN Gateway may start a locally configured guard timer. The PDN Gateway may re-attempt, up to a pre-configured number of times, when either it detects the wireless device accesses via a new SGW or at expiry of the guard timer.

If the wireless device is registered in the MME, the MME sends a paging message S1 to each eNodeB belonging to the tracking area(s) in which the wireless device is registered. The paging message comprises in one example at least some of the following information: Non-Access Stratum, NAS, ID for paging, Globally Unique Tracking Area Identity, TAI(s), wireless identity based Discontinuous Reception, DRX, index, paging DRX length, list of Closed subscriber group, CSG, IDs for paging, paging priority indication).

In case that extended paging DRX length is used, for example taking into account that eNodeB supports extended paging DRX length as well as the paging attempt identifier number, the MME sends the paging message S1 comprising the paging attempt identifier number. The transmission of the paging message S1 from the MME to the eNodeB and the transmission of the paging message S2 from the eNodeB to the wireless device is in one example omitted if the MME already has a signalling connection over S1-MME towards the wireless device but the S1-U tunnel has not yet been established. Paging priority indication is in one example included only if the MME receives a Downlink Data Notification message or Create Bearer Request with ARP associated with Multimedia Priority Service, MPS. The ARP value for MPS is configured by operator policy. If the eNodeB during a congestion situation receives the paging message S1 with paging priority indication, eNodeB performs in one example the paging procedure with priority according to the indication.

If the MME, while waiting for a UE response to the paging Request message sent without priority indication, receives an Update Bearer Request, Create Bearer Request or Downlink Data Notification, any of which indicates a priority associated with MPS service, the MME sends in one example another paging message with paging priority.

When the MME is configured to support paging optimisation in the Core Network, CN, the MME avoids in one example sending paging messages to those eNodeB(s) with Closed Subscriber Group, CSG, cells for which the wireless device does not have a CSG subscription. When the MME is configured to support paging optimisation in the Home eNode B, HeNodeB, Subsystem, the list of CSG IDs for paging is in one example included in the paging message. For paging optimisation, the CSG IDs of expired CSG subscriptions and valid CSG subscriptions are in one example both included in the list. If the wireless device has emergency bearer service the MME is on one example arranged to not perform the paging optimization.

Note that an expired CSG subscription indicates that the wireless device is not allowed service in the CSG. However, since the removal of the CSG from the wireless device is pending, it is possible the wireless device will camp on that CSG and therefore the wireless device is still paged for the CSG. Further, the eNodeB reports to the MME the CSG ID supported.

The MME may use the EPS bearer context information identified by EPS bearer ID received in Downlink Data Notification message S32 in order to control the paging based on operator policy, such as:

paging retransmission strategies;
determining whether to send the paging message to the eNodeBs during certain MME high load conditions;
paging optimisations for traffic arriving on the PDN connection used for Local IP Access without mobility or Selected Internet IP Traffic Offload, SIPTO, at the Local Network with Local Gateway, L-GW, function collocated with the (home) eNodeB.

Note that the paging priority in the paging message is in one example set based on ARP received in Downlink Data Notification or Create Bearer Request message.

If the wireless device is registered in the SGSN, the SGSN sends paging messages S3 to RNC/BSS.

If the eNodeB 321 receives paging messages S1 from the MME, the eNodeB transmits a paging message S2 to the wireless device. The paging message S2 to the wireless device comprises the paging attempt identifier number. In one example, the eNodeB 321 adds the paging attempt identifier number if received in the S1AP paging message to the paging message sent to the wireless device over the Uu interface. In one example, the paging attempt identifier number is added as a now information element.

If the RNC/BSS node 321 receives paging messages S1 from the SGSN, the RNC/BSS node transmits the paging message S2 to the wireless device, wherein the paging message comprises the paging attempt identifier number.

When the wireless device is in Evolved Packet System, EPS, Connection Management—IDLE state, upon reception of the paging message S2 in E-UTRAN access, the wireless device initiates a wireless device triggered Service Request procedure P33.

When the wireless device is in the ECM-IDLE state, upon reception of paging indication in E-UTRAN access that comprises the paging attempt identifier number while the validity time for the paging attempt number is running the following is performed. If the MME already has a signalling connection over S1-MME towards the wireless but the S1-U tunnel has not yet been established, then the messages sequence performed start from the step when MME establishes the bearer(s).

Upon reception of the paging message S2 in UMTS Terrestrial Radio Access Network, UTRAN, or GSM EDGE Radio Access Network, GERAN access, the wireless device responds in respective access and the SGSN notifies the Serving Gateway.

The MME and/or SGSN supervise the paging procedure with a timer. If the MME and/or SGSN receive no response from the wireless device to the paging message S1, it may repeat the paging. The repetition strategy is operator dependent.

If the MME and/or SGSN receive no response from the wireless device after this paging repetition procedure, it uses the Downlink Data Notification Reject message to notify the Serving Gateway about the paging failure. In that case, if Idle State Signalling Reduction, ISR, is not activated, the Serving Gateway deletes the buffered packet(s). If Idle State Signalling Reduction, ISR, is activated and the Serving Gateway receives paging failure from both the SGSN and MME, the Serving Gateway deletes the buffered packet(s) or rejects the control signalling which triggers the Service Request procedure. The Serving Gateway may invoke the procedure Packet Data Network Gateway, PGW, Pause of Charging if the wireless device is in ECM IDLE and the PDN Gateway has enabled "PDN charging pause" feature.

Note that the Serving Gateway may initiate the procedure PGW Pause of Charging at any time if the wireless device is in ECM IDLE and the PDN Gateway has indicated that the feature is enabled for this PDN.

If ISR is activated and paging response is received in Evolved E-UTRAN access the Serving Gateway sends a "Stop paging" message S34 to the SGSN.

If ISR is activated and paging response is received in UTRAN or GERAN access the Serving Gateway sends a "Stop Paging" message S34 to the MME.

Figure 6A:
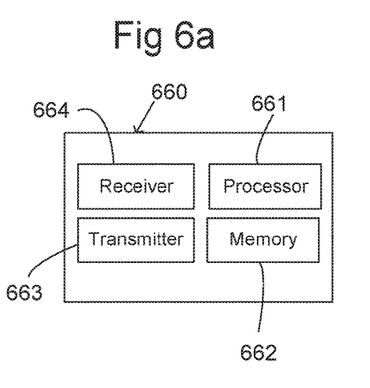
FIG. 6 is a block scheme of an example of a wireless device
Figure 6B:
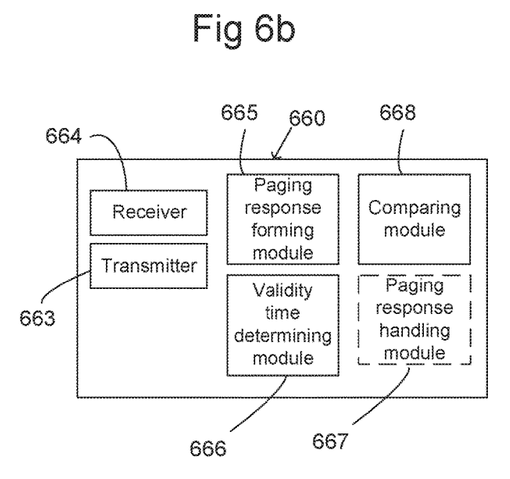

In FIGS. 6a and 6b, a wireless device 660 of a network is illustrated. The wireless device comprises processing means comprising a processor 661 and a memory 662. The memory 662 contains instructions executable by said processor 661. The processing means are operative to determine if a validity time for a paging attempt identifier number is running. The paging attempt identifier number is comprised in a received paging message. In one example, the wireless device comprises a validity time determining module 666. The wireless device is further arranged to form a paging response message when the validity time for the paging attempt identifier number is not running. In one example, the wireless device comprises a paging response forming module 665.

When the validity time for the paging attempt identifier number is running, the processing means are operative to compare the paging attempt identifier number of the received paging message with a stored paging attempt identifier number. In one example, the wireless device comprises a comparing module 668 arranged to compare the paging attempt identifier number of the received paging message with the stored paging attempt identifier number. When the received paging attempt identifier number is different from the stored paging attempt identifier number, the processing means are operative to form a paging response message. When the received paging attempt identifier number equals the stored paging attempt identifier number, the processing means are operative to ignore the received paging message. Thus, the processing means are arranged to perform legacy procedure attempting to response to the paging if the paging attempt identifier number received is not the same as the one currently stored.

The wireless device 660 comprises in one example a receiver 664 arranged to receive the paging message comprising the paging attempt identifier number. The wireless device comprises in one example a transmitter 663 arranged to transmit the formed paging response message.

The wireless device 660 is in one example further operative to determine whether the transmitted paging response was successful and when determined successful store the paging attempt identifier number in the memory and start a paging attempt identifier number timer so as to count the validity time for the paging attempt identifier number. The determination of whether the transmitted paging response was successful initiates a procedure which at least implicitly forms a response to the paging messages. Examples of ways of determining whether the transmitted paging response is successful are described in detail above. The transmitter 663 is arranged to re-transmit the formed paging response when the transmitted paging response was not determined successful until the paging response is determined successful or until a predetermined number of attempts have been made, whichever occur first. These operations are in one example performed by a paging response handling module 667.

In one example, the wireless device 660 is operative to inactivate or delete the currently stored paging attempt identifier number upon reaching the validity time for the paging attempt identifier number.

Thus, if the paging response was successful, the wireless device is in one example arranged to store the paging attempt identifier number during the validity time for the paging attempt identifier number, e.g. for the duration of its DRX cycle. At the expiration of the validity time associated to paging attempt identifier number, the wireless device deletes or otherwise inactivates the last stored paging attempt identifier number.

If a new Paging message is received by the device while validity time for the paging attempt identifier number is running, the new paging message is evaluated. When the new Paging message comprises the same paging attempt identifier number as the one currently stored, the wireless device ignores the new Paging message. This means that it does not attempt to access the network to respond to the paging. The paging message has already been already received and successfully replied to once.

When the new paging message comprises a different paging attempt identifier number than the one currently stored, the wireless device is arranged to perform the legacy procedure to convey a paging response message to the network. If the paging response procedure was successful, the wireless device replaces the last stored paging attempt identifier number with the most recent received paging attempt identifier number and re-initiates a timer with validity time value.

The validity time for the paging attempt identifier number is in one example determined to be equal to the length of a Discontinuous reception, DRX, cycle associated to the wireless device or a multiple of the length of the Discontinuous Reception, DRX, cycle associated to the wireless device.

In one example, information related to the validity time for the paging attempt identifier number is comprised in dedicated signaling for example in the received paging message or in system information or over Non-access stratum, NAS, signaling or configured for example by Open Mobile Alliance Device Management, OMA DM.

The memory 662 forms a computer-readable storage medium. The memory has stored thereon a computer program. The computer program is in one example operative to operative to determine if a validity time for a paging attempt identifier number is running. The paging attempt identifier number is comprised in a received paging message. When the validity time for the paging attempt identifier number is not running, the computer program is operative to form a paging response message. When the validity time for the paging attempt identifier number is running, the computer program is operative to compare the paging attempt identifier number of the paging message with a stored paging attempt identifier number, and form a paging response message when the received paging attempt identifier number is different from the stored paging attempt identifier number or ignore the received paging message when the received paging attempt identifier number equals the stored paging attempt identifier number.

Figure 5:
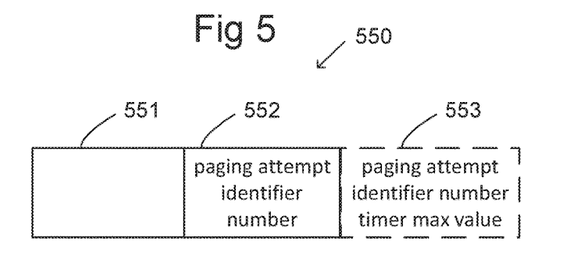
FIG. 5 illustrates an example of a paging message.

FIG. 5 shows an example of a paging message 550. In the illustrated example, the paging message comprises information related to a paging attempt identifier number 552. The paging message comprises in one example further a validity time for a paging attempt identifier number 553. The paging message comprises further other information 551. The other information comprises in one example at least some of the following information: Non-Access Stratum, NAS, ID for paging, Globally Unique Tracking Area Identity, TAI(s), wireless identity based Discontinuous Reception, DRX, index, paging DRX length, list of Closed subscriber group, CSG, IDs for paging, paging priority indication).

Figure 4:
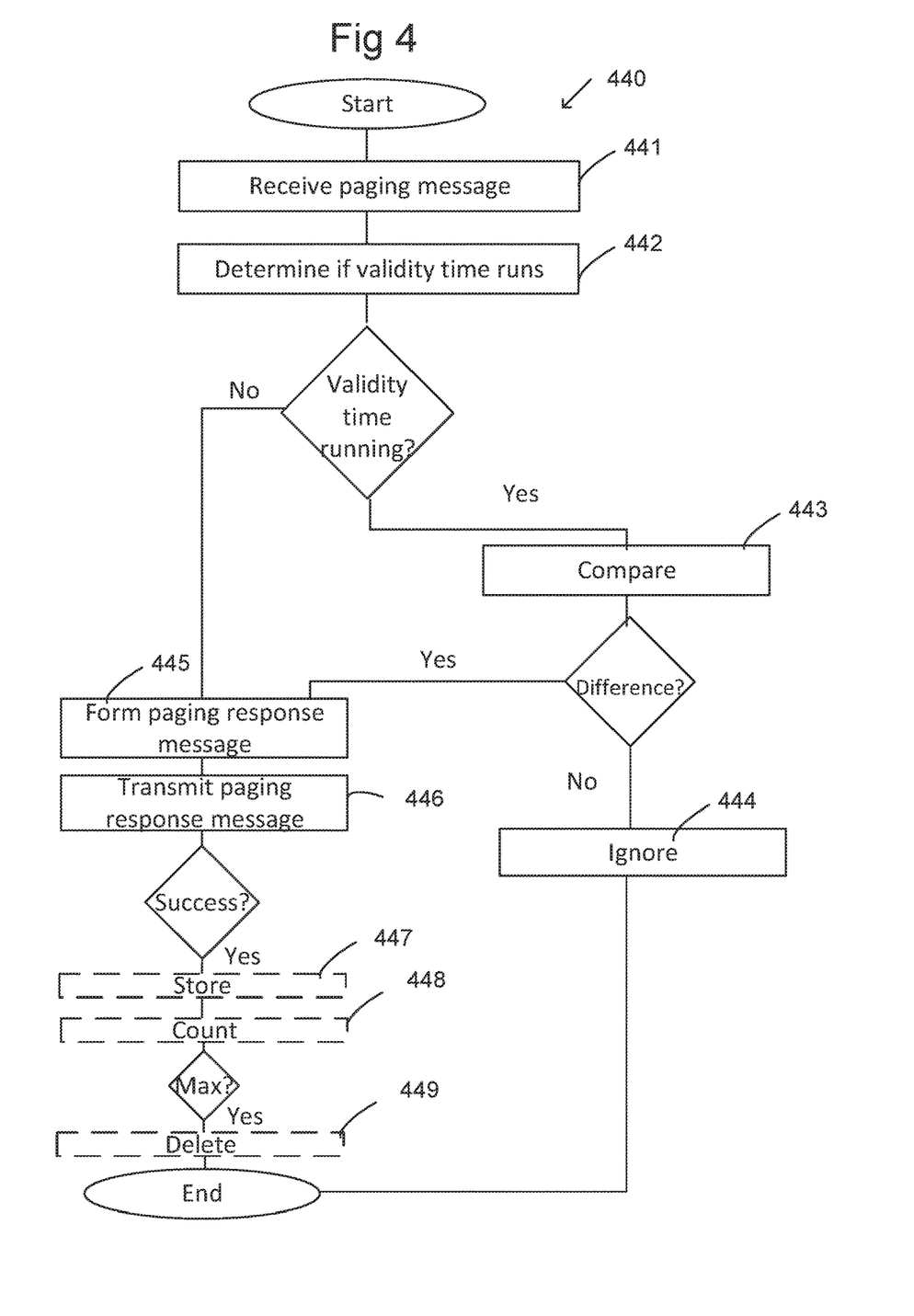
FIG. 4 is a flow chart illustrating an example of a method performed in a wireless device.

FIG. 4 shows a method 440 performed in a wireless device. The method comprises a step of receiving 441 a paging message. The paging message comprises at least a paging attempt identifier number. The method further comprises a step of determining 442 if a validity time for a paging attempt identifier number is running. The method further comprises a step of forming 445 a paging response message when the validity time for the paging attempt identifier number is not running.

When the validity time for the paging attempt identifier number is running, the method comprises a step of comparing 443 the paging attempt identifier number of the Paging message with a stored paging attempt identifier number. The paging response message is then formed 445 when the received paging attempt identifier number is different from the stored paging attempt identifier number. When the received paging attempt identifier number equals the stored paging attempt identifier number, the received paging message is then ignored 444.

The method further comprises step of transmitting 446 the formed paging response.

In one example, the method further comprises a step of determining whether the transmitted paging response was successful. If determined successful, the method further comprises steps of storing 447 the paging attempt identifier number in the memory and starting 448 counting of the validity time for the paging attempt identifier number, i.e. starting a counter.

In one example, the method further comprises a step of inactivating or deleting 449 the currently stored paging attempt identifier number upon reaching the paging attempt identifier number timer max value.

Figure 7:
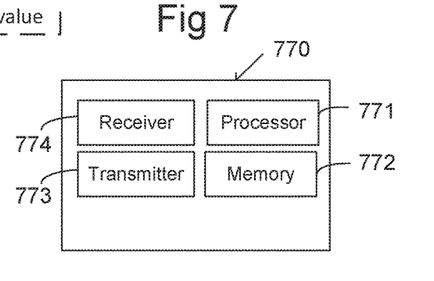
FIG. 7 is a block scheme illustrating an example of a core network node.

FIG. 7 relates to a core network node 770 comprising at least one processor 771 and at least one memory 772. The at least one memory contains instructions executable by said at least one processor whereby said core network node is operative to form a paging message comprising a paging attempt identifier number. The core network node 770 further comprises a transmitter 773 arranged to transmit the formed paging message comprising the paging attempt identifier number. The transmitter is in one example arranged to transmit wirelessly. The transmitter is one example arranged to transmit by wire. The core network node comprises in one example a receiver arranged to receive Downlink Data Notifications from a Serving gateway. In one example, the core network node is a MME. In one example, the core network node is a SGSN In one example, the core network node is operative to determine whether the paging attempt identifier number is to be included in the paging message. In this case, the forming of the paging message is performed based on the determination whether the paging attempt identifier number is to be included in the paging message. If the paging attempt identifier number is to be included in the paging message, the paging message is formed comprising the paging attempt identifier number.

When a paging attempt identifier number has been included in a paging message, this paging attempt identifier number is in one example regarded as spent. Subsequent paging messages are then arranged to include other paging attempt identifier numbers. In one example, the paging attempt identifier number is regarded as spent within the validity time for the paging attempt identifier number.

In one example, the core network node 770 further comprises a receiver 774 arranged to receive a Downlink Data Notification from a Serving Gateway. The core network node is arranged to form the paging message based on the received Downlink Data Notification. The receiver 774 is in one example arranged to receive the Downlink Data Notification wirelessly. The receiver 774 is one example arranged to receive the Downlink Data Notification by wire.

The transmitter 773 is in one example arranged to transmit a Downlink Data Notification Acknowledge to the Serving Gateway.

A computer-readable storage medium, for example the at least one memory 772 has stored thereon a computer program operative to form a paging message comprising a paging attempt identifier number.

Figure 8:
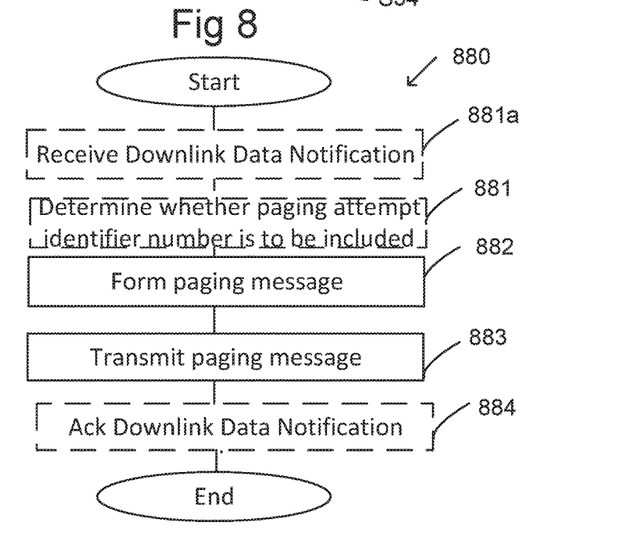
FIG. 8 is a flow chart illustrating an example of a method performed in a core network node.

FIG. 8 illustrates method 800 performed in a core network node. In one example, the core network node is a MME. In one example, the core network node is a SGSN. The method 800 comprises a step of forming 882 a paging message comprising a paging attempt identifier number and transmitting 883 the formed paging message comprising the paging attempt identifier number.

In different embodiments the method further comprises a step of determining 881 whether the paging attempt identifier number is to be included in the paging message. The step of forming 882 the paging message is then performed based on the determination whether the paging attempt identifier number is to be included in the paging message.

In different embodiments, the step of determining 881 whether the paging attempt identifier number is to be included in the paging message is based on the capability of the wireless device to handle paging messages comprising the paging attempt identifier number. If the wireless device cannot handle paging attempt identifier numbers, this information is then not included in the paging message.

In different embodiments, the step of determining 881 whether the paging attempt identifier number is to be included in the paging message is based on the length of the DRX cycle. In one example the paging attempt identifier number is included in the paging message when the length of the DRX cycle exceeds a predetermined length. In one example the paging attempt identifier number is not included in the paging message when the length of the DRX cycle does not exceed the predetermined length.

In one example, the method 800 further comprises a preceding step of receiving 881*a* data downlink notification. In one example, the method 800 comprises a step of transmitting 884 an acknowledge to the received data downlink notification.

The invention claimed is:

1. A wireless device for handling of paging in a network, said wireless device comprising a processor, a memory storing instructions executed by the processor, and a transmitter, the processor configured by execution of the instructions to determine if a validity time for a paging attempt identifier number is running, wherein the paging attempt identifier number is comprised in a received paging message, wherein a receiver of the wireless device is arranged to receive the paging message comprising the paging attempt identifier number, and when the validity time for the paging attempt identifier number is not running, form a paging response message, or when the validity time for the paging attempt identifier number is running, compare the paging attempt identifier number of the paging message with a stored paging attempt identifier number, and form a paging response message when the received paging attempt identifier number is different from the stored paging attempt identifier number or ignore the received paging message when the received paging attempt identifier number equals the stored paging attempt identifier number, and said transmitter being arranged to transmit the formed paging response message, wherein the processor is further configured by execution of the instructions to determine whether transmission of the paging response message was successful, and when transmission of the paging response message is determined to be successful, to store the paging attempt identifier number in the memory and start counting the validity time for the paging attempt identifier number, and wherein the transmitter is further configured to re-transmit the formed paging response when the transmission of the paging response message is not determined to be successful until the transmission of the paging response message is determined to be successful or until a predetermined number of attempts have been made, whichever occur first.

2. The wireless device according to claim 1, wherein the processor is further configured to inactivate or delete the stored paging attempt identifier number upon reaching the validity time for the paging attempt identifier number.

3. The wireless device according to claim 1, wherein the processor is further configured to determine the validity time for the paging attempt identifier number to be equal to a length of a Discontinuous reception, DRX, cycle associated to the wireless device or a multiple of the length of the Discontinuous reception, DRX, cycle associated to the wireless device.

4. The wireless device according to claim 1, wherein information related to the validity time for the paging attempt identifier number is:

comprised in dedicated signaling in the received paging message and/or comprised in system information provided in dedicated signaling or on broadcast channel, and/or obtained over Non-access stratum, NAS, signaling, and/or configured by Open Mobile Alliance Device Management, OMA DM.

5. A non-transitory computer readable medium storing computer program code that when executed by a processor of a wireless device, causes the processor to:

determine if a validity time for a paging attempt identifier number is running, wherein the paging attempt identifier number is comprised in a received paging message, and when the validity time for the paging attempt identifier number is not running, form a paging response message, when the validity time for the paging attempt identifier number is running, compare the paging attempt identifier number of the paging message with a stored paging attempt identifier number, and form a paging response message when the received paging attempt identifier number is different from the stored paging attempt identifier number or ignore the received paging message when the received paging attempt identifier number equals the stored paging attempt identifier number, wherein the processor is further caused to determine whether transmission of the paging response message was successful and when transmission of the paging response message is determined to be successful, to store the paging attempt identifier number in a memory and start counting the validity time for the paging attempt identifier number, and re-transmit the formed paging response when the transmission of the paging response message is not determined to be successful until the transmission of the paging response message is determined to be successful or until a predetermined number of attempts have been made, whichever occur first.

6. A method for handling of paging performed in a wireless device, said method comprising the steps of:

determining if a validity time for a paging attempt identifier number is running, wherein the paging attempt identifier number is comprised in a received paging message, and when the validity time for the paging attempt identifier number is not running, forming a paging response message, when the validity time for the paging attempt identifier number is running, comparing the paging attempt identifier number of the Paging message with a stored paging attempt identifier number, and forming the paging response message when the received paging attempt identifier number is different from the stored paging attempt identifier number or ignoring the received paging message when the received paging attempt identifier number equals the stored paging attempt identifier number, and transmitting the formed paging response message, wherein transmitting the formed paging response message further comprises:

determining whether transmission of the paging response message was successful and when transmission of the paging response message is determined to be successful, storing the paging attempt identifier number in the memory and starting to count the validity time for the paging attempt identifier number, and re-transmitting the formed paging response message when the transmission of the paging response message is not determined to be successful until the transmission of the paging response message is determined to be successful or until a predetermined number of attempts have been made, whichever occur first.

7. The method according to claim 6, further comprising a step of inactivating or deleting the stored paging attempt identifier number upon reaching the validity time for the paging attempt identifier number.

\* \* \* \* \*